(12) United States Patent
Gao et al.

(10) Patent No.: US 11,207,742 B2
(45) Date of Patent: Dec. 28, 2021

(54) QUICK CHANGE STRUCTURE FOR MULTI-FUNCTIONAL SAWS AND QUICK CHANGE METHOD

(71) Applicant: ZHEJIANG JINMEI ELECTRIC TOOLS CO., LTD., Jinhua (CN)

(72) Inventors: Jinyun Gao, Jinhua (CN); Zhiming Feng, Jinhua (CN)

(73) Assignee: ZHEJIANG JINMEI ELECTRIC TOOLS CO., LTD., Jinhua (CN)

( * ) Notice: Subject to any disclaimer, the term of this patent is extended or adjusted under 35 U.S.C. 154(b) by 595 days.

(21) Appl. No.: 16/092,427

(22) PCT Filed: Apr. 8, 2018

(86) PCT No.: PCT/CN2018/082201
§ 371 (c)(1),
(2) Date: Oct. 9, 2018

(87) PCT Pub. No.: WO2019/029175
PCT Pub. Date: Feb. 14, 2019

(65) Prior Publication Data
US 2021/0213550 A1 Jul. 15, 2021

(30) Foreign Application Priority Data
Aug. 8, 2017 (CN) .......................... 201710671524.7

(51) Int. Cl.
*B23D 61/00* (2006.01)
(52) U.S. Cl.
CPC .................... *B23D 61/00* (2013.01)

(58) Field of Classification Search
CPC .. B27B 5/30; B27B 31/18; B27B 5/32; B27B 19/006; B23B 31/4073; B23B 31/10; B23B 31/19; B23B 31/16229; B24B 45/006; B24B 23/04; B24B 45/00; B24B 23/022; Y10T 179/33; Y10T 297/185; Y10T 279/3451; B23D 63/003; B24D 5/16; B23Q 3/12; B25F 5/00; A61B 17/142
(Continued)

(56) References Cited

U.S. PATENT DOCUMENTS

| | | | | |
|---|---|---|---|---|
| 4,730,952 A * | 3/1988 | Wiley | ................... | B24B 45/006 30/388 |
| 8,960,688 B2 * | 2/2015 | Zhou | ..................... | B24B 45/006 279/141 |

(Continued)

*Primary Examiner* — Ghassem Alie
(74) *Attorney, Agent, or Firm* — Jiwen Chen; Jacobson Holman PLLC

(57) ABSTRACT

The present invention relates to a quick change structure for multi-functional saws and a quick change method. The quick change structure has a head housing, an output shaft and a quick change device. On the quick change device, a quick change handle can be pulled to drive an eccentric block, a movable rod, a small cylindrical compression spring and a movable bracket in turn such that the second cylindrical pin at the lower part of the movable bracket moves downward in the guide slot of each one of locking pins, driving the locking pins to rotate around a third cylindrical pin to fold together. After a saw blade is placed, the locking pins will unfold when an upward force is applied, and then the locking pins lock the saw blade to realize quick change of the saw blade.

8 Claims, 7 Drawing Sheets

(58) Field of Classification Search
USPC ............... 83/698.11; 279/141, 106; 451/359; 483/55
See application file for complete search history.

(56) References Cited

U.S. PATENT DOCUMENTS

| | | | |
|---|---|---|---|
| 9,174,354 B2* | 11/2015 | Zhou | B24B 23/04 |
| 9,555,554 B2* | 1/2017 | Thorson | B24B 45/006 |
| 2009/0023371 A1* | 1/2009 | Blickle | B24B 45/006 |
| | | | 451/359 |
| 2012/0292864 A1* | 11/2012 | Zhou | B24B 45/006 |
| | | | 279/141 |
| 2013/0082449 A1* | 4/2013 | Bernardi | B24B 23/04 |
| | | | 279/141 |
| 2015/0108725 A1* | 4/2015 | Luescher | B27B 19/006 |
| | | | 279/141 |

* cited by examiner

US 11,207,742 B2

QUICK CHANGE STRUCTURE FOR MULTI-FUNCTIONAL SAWS AND QUICK CHANGE METHOD

This is a U.S. national stage application of PCT Application No. PCT/CN2018/082201 under 35 U.S.C. 371, filed Apr. 8, 2018 in Chinese, claiming priority of Chinese Application No. 201710671524.7, filed Aug. 8, 2017, all of which are hereby incorporated by reference.

BACKGROUND OF THE INVENTION

Technical Field

The present invention belongs to the technical field of mechanical equipment and relates to a detachable structure for quick separation or assembling of a tool bit and a machine body of a replaceable tool bit type electrical tool, in particular to a quick change structure for multi-functional saws. The present invention also discloses a quick change method of the quick change structure for multi-functional saws.

Description of Related Art

The majority of multi-functional saws on the market employ a pressure plate and inner hexagon screws. The saw blade of a multi-functional saw is usually fastened or unfastened using a special tool or by manually rotating a fastening ring. Without a locking safety structure, the saw blade of the multi-functional saw with such structure and replacement manner tends to become loose during rotation, bringing potential hazards to safety use. Besides, the fastening and dismantling operations are complicated. Sometimes, fastening fails, and sometimes, dismantling fails. At the same time, a hexagon wrench is required. The hexagon wrench is required to be portable, and has the defect of tending to be lost.

In order to solve the above problems, a Chinese invention patent application, with a publication number of CN103317190A and a title of Saw Blade Quick Gripping for Multi-Functional Saws, discloses a structure, wherein a spindle is a hollow cylinder; positioning convex platforms which are circumferentially distributed on the face, contacting with a saw blade, of a front end of the spindle fit with corresponding concave holes of the saw blade to prevent the saw blade from rotating with respect to the spindle; a pull rod is penetrated into the spindle; the pull rod has a large-diameter convex portion at the front end; the diameter of the large-diameter convex portion is greater than the diameter of the middle portion of the pull rod; the large-diameter convex portion and a pressure plate are in a male-female fit to press the saw blade tightly; the pull rod is sleeved with an ejector bushing on the rear side of the large-diameter convex portion; the saw blade is primarily positioned on the positioning convex platforms and the excircle surface of the ejector bushing; the spindle is internally provided with an elastic saw pressing mechanism which drives the pull rod to move backward such that the pressure plate and the large-diameter convex portion fit with each other to press the saw blade tightly; the head of a handpiece is provided with a pull rod pressing mechanism behind the pull rod to press the pull rod down, and the spindle is internally provided with an elastic pressure plate ejector structure which springs the pressure plate out during replacement of the saw blade. The above structure ensures quick installation and dismantling of the saw blade. However, an ejection spring and a reset spring need to work together to execute the quick exchange operation, and the operation tends to go wrong after long-term use, bringing certain inconvenience to users.

Therefore, the quick change structures of the current multi-functional saws need to be further improved.

BRIEF SUMMARY OF THE INVENTION

In order to overcome the above-mentioned defects, expand the application scope of products, and improve the operation feeling of products, the present invention provides a quick exchange structure for multi-functional saws, realizing quick change of saw blades.

To achieve the above objects, the present invention employs the following technical scheme.

The present invention relates to a quick change structure for multi-functional saws, comprising a head housing, an output shaft and a saw blade; the output shaft is a hollow structure; the output shaft is arranged in the head housing; the saw blade is arranged at the bottom of the output shaft and is detachably connected with the output shaft; characterized in that the quick change structure for multi-functional saws also comprises a quick change device, where the quick change device comprises a quick change handle, an eccentric block, a movable rod, a small cylindrical compression spring, a plastic support block, a movable bracket, a cylindrical compression spring, a plastic fixed seat, two locking pins and a positioning ring; and the quick change handle is matched with the eccentric block, and is connected to the top of the head housing through a first cylindrical pin.

The movable rod, the small cylindrical compression spring, the plastic support block, the movable bracket and the cylindrical compression spring are all arranged in the hollow space of the output shaft; the top of the movable rod contacts the eccentric block; the small cylindrical compression spring is arranged at the bottom of the movable rod; the top of the small cylindrical compression spring contacts the bottom of the movable rod; the plastic support block is inserted into a groove on the top of the movable bracket; the bottom of the small cylindrical compression spring contacts the plastic support block; a convex strip is arranged on the outer race of the top of the movable bracket; the plastic fixed seat is arranged at the outer race of the movable bracket; the plastic fixed seat is fixed with the inner race of the bottom of the output shaft; the cylindrical compression spring is externally sleeved on the plastic support block, and has a top end supported at the lower surface of the convex strip at the top of the movable bracket, and a bottom end supported at the upper surface of the plastic fixed seat.

The two locking pins are matched with each other; the upper part of each one of the two locking pins is formed with a guide slot, while the lower part is formed with a limiting hole; each one of the guide slots has an inward inclination angle from the top down; a bent hook portion as a limiting mechanism is arranged at the bottom of each one of the guide slots; a second cylindrical pin is arranged at the bottom of the movable bracket; the second cylindrical pin passes through the guide slot of each one of the two locking pins; a third cylindrical pin is arranged at the bottom of the output shaft; and the third cylindrical pin passes through the plastic fixed seat and the limiting hole of each one of the two locking pins in turn.

A positioning ring is sleeved at the bottom excircle of the output shaft; a plurality of first clamping positions are formed at the inner wall of the positioning ring; a convex platform is formed on an upper surface of the saw blade; a clamping groove is formed in the center of the convex platform; second clamping positions are formed at the external race of the convex platform; the clamping groove is matched with the locking pins; the second clamping positions and the first clamping positions are consistent in quantity and matched with each other.

The plastic fixed seat plays the role of bushing the two locking pins and connecting the cylindrical pins of the two locking pins to prevent the locking pins from swinging left and right; and the positioning ring plays the role of fixing the saw blade to prevent the saw blade from falling off during use.

Preferably, a deep groove ball bearing, a shift fork and a needle bearing are arranged between the head housing and the output shaft; the output shaft is divided into three segments, namely an upper segment, a middle segment, and a lower segment, as the outer diameter increases gradually; the deep groove ball bearing is arranged on the outer race of the upper segment of the output shaft; the shift fork is arranged on the outer race of the middle segment of the output shaft; and the needle bearing is arranged on the outer race of the lower segment of the output shaft. The deep groove ball bearing and the needle bearing play the role of preventing the output shaft from swinging during rotation, and the shift fork plays the role of controlling the rotation speed of the output shaft.

Preferably, the number of the first clamping positions and the second clamping positions may be both 6, 8, 10 or 12.

Preferably, a compression spring mounting hole is respectively formed at the bottom of the movable rod and at the top of the movable bracket; the upper and lower ends of the small cylindrical compression spring are both inserted into the compression spring mounting holes to help the small cylindrical compression spring always exist at the axial position.

Preferably, a sealing ring is arranged below the needle bearing; the outer race and inner race of the sealing ring are respectively connected to the outer wall of the output shaft and the inner wall of the head housing.

Preferably, the deep groove ball bearing is fixed through two snap rings; the upper end of the deep groove ball bearing is connected with the exterior of the output shaft through one of the snap rings, and the lower end is connected with the inner wall of the head housing through the other snap ring.

Preferably, the plastic fixed seat is provided with two symmetrical cylindrical pin mounting holes, and the two ends of the third cylindrical pin are respectively inserted into the two cylindrical pin mounting holes.

The present invention also provides a quick change method adopting the above-mentioned quick change structure for multi-functional saws, characterized by including the following steps:

(1) pulling the quick change handle by taking the first cylindrical pin as a rotating center such that the quick change handle drives the eccentric block to rotate;

(2) counteracting the spring forces of the small cylindrical compression spring and the cylindrical compression spring in virtue of an eccentric distance to press the movable rod down and then drive the movable bracket to move downward;

(3) driving the second cylindrical pin at the lower part of the movable bracket to move downward and reach the bent hook portions of the guide slots by the movable bracket, where each one of the guide slots has an inward inclination angle from the top down, so that the second cylindrical pin applies a transverse acting force onto the locking pins during the downward moving process to drive the locking pins to rotate around the third cylindrical pin and then fold together;

(4) rotating the quick change handle to the initial position, where the bent hook portion of each one of the guide slots plays a limiting role; at the same time, the plastic support block is pressed at the locking pins through the small cylindrical compression spring, the movable bracket fails to spring back, and the locking pins remain folded continuously;

(5) placing the saw blade below the locking pins, and applying an upward acting force to drive the second cylindrical pin to move upward and counteract the spring force of the small cylindrical compression spring, driving the movable bracket to move back to the initial position by the effect of the cylindrical compression spring, and locking the saw blade by the locking pins.

The technical scheme provided by the present invention, compared with the prior art, has the following beneficial effects:

The quick change structure for multi-functional saws of the present invention can achieve the objects of dismantling and changing the saw blade simply by pulling the quick change handle on the upper side of the head housing, without using other auxiliary tools. The operation is simple and fast.

Figure 1:
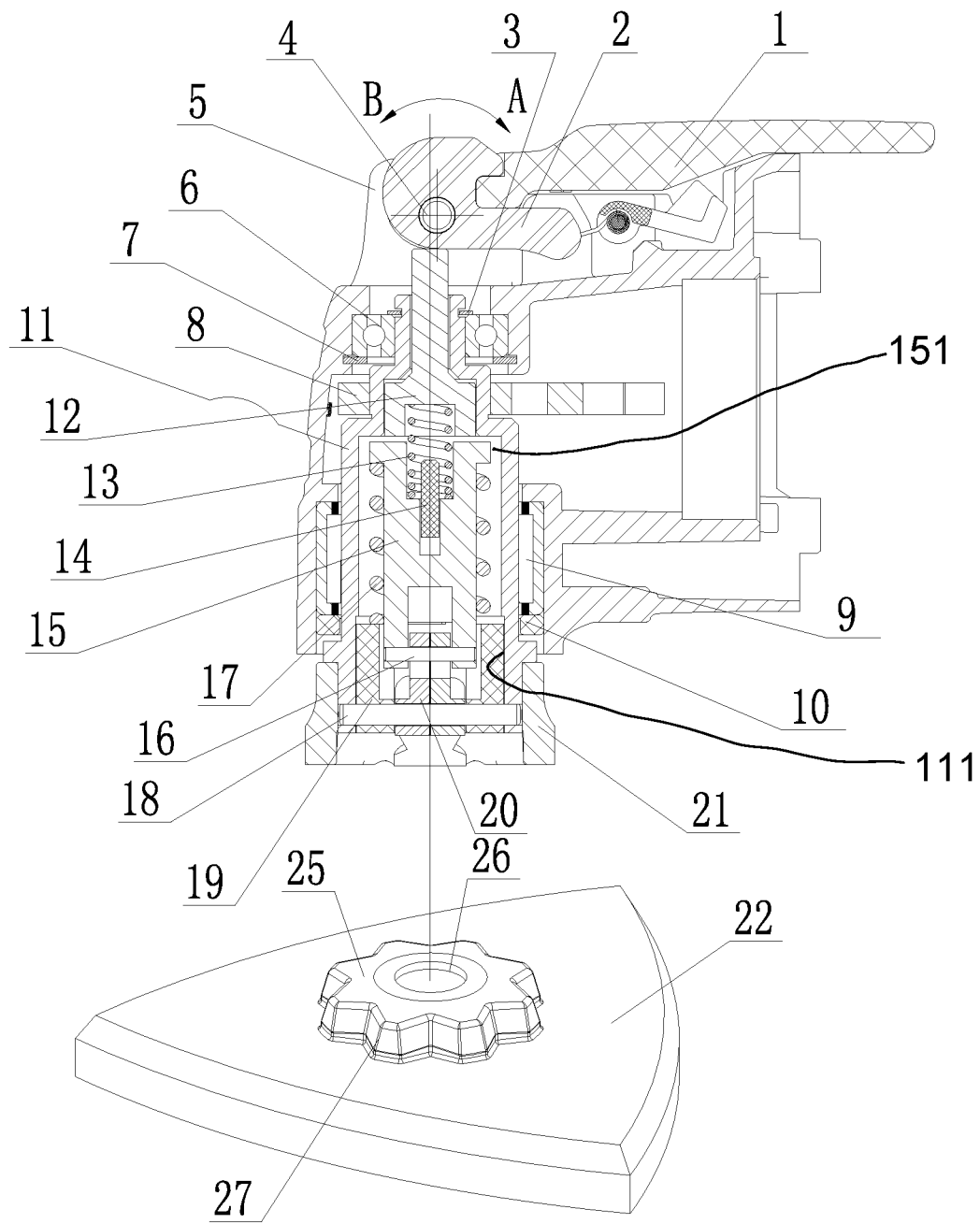
FIG. 1 is a schematic view of the initial state of a quick change structure for multi-functional saws of the present invention.

Descriptions of marks in the drawings: quick change handle 1; eccentric block 2; snap spring 3; first cylindrical pin 4; head housing 5; deep groove ball bearing 6; snap spring 7; shift fork 8; needle bearing 9; sealing ring 10; output shaft 11; movable rod 12; small cylindrical compression spring 13; plastic support block 14; movable bracket 15; second cylindrical pin 16; cylindrical compression spring 17; third cylindrical pin 18; plastic fixed seat 19; locking pin 20; positioning ring 21; saw blade 22; guide slot 23; first clamping position 24; convex platform 25; clamping groove 26; second clamping position 27.

DETAILED DESCRIPTION OF THE INVENTION

In order to help people further understand the contents of the present invention, the present invention is described in detail in conjunction with the attached drawings and embodiments. The following embodiments apply to the present invention, but cannot be regarded as limiting the scope of the present invention.

As shown in FIG. 1, in this embodiment, a quick change structure for multi-functional saws includes a quick change handle 1, an eccentric block 2, a snap spring 3, a first cylindrical pin 4, a head housing 5, a deep groove ball bearing 6, a snap spring 7, a shift fork 8, a needle bearing 9, a sealing ring 10, an output shaft 11, a movable rod 12, a small cylindrical compression spring 13, a plastic support block 14, a movable bracket 15, a second cylindrical pin 16, a cylindrical compression spring 17, a third cylindrical pin 18, a plastic fixed seat 19, a locking pin 20, a positioning ring 21 and a saw blade 22. The top of the head housing 5 is connected with the quick change handle 1 and the eccentric block 2 through the first cylindrical pin 4; the deep groove ball bearing 6, the shift fork 8 and the needling bearing 9 are installed in a hollow cavity in the head housing 5 from the top down, where the deep groove ball bearing 6 is connected to the inner wall of the head housing 5 through the snap spring 7; the inner side of the deep groove ball bearing 6, the inner side of the shift fork 8 and the inner side of the needle bearing 9 are respectively connected to the upper, middle and lower segments of the output shaft 11, where the upper segment of the output shaft 11 is provided with a snap spring mounting groove, the output shaft 11 is connected with the deep groove ball bearing 6 through the snap spring 3 in the snap spring mounting groove; the inner diameter of the deep groove ball bearing 6 and the inner diameter of the needle bearing 9 are respectively 0.1-0.3 mm greater than the outer diameters of the upper and lower segments of the output shaft 11, playing a positioning role and a vibration prevention role; the shift fork 8 plays the role of adjusting the rotating speed of the output shaft 11; and an annular sealing ring 10 is arranged in a gap between the head housing 5 at the lower side of the needle bearing 9 and the output shaft 11.

Figure 2:
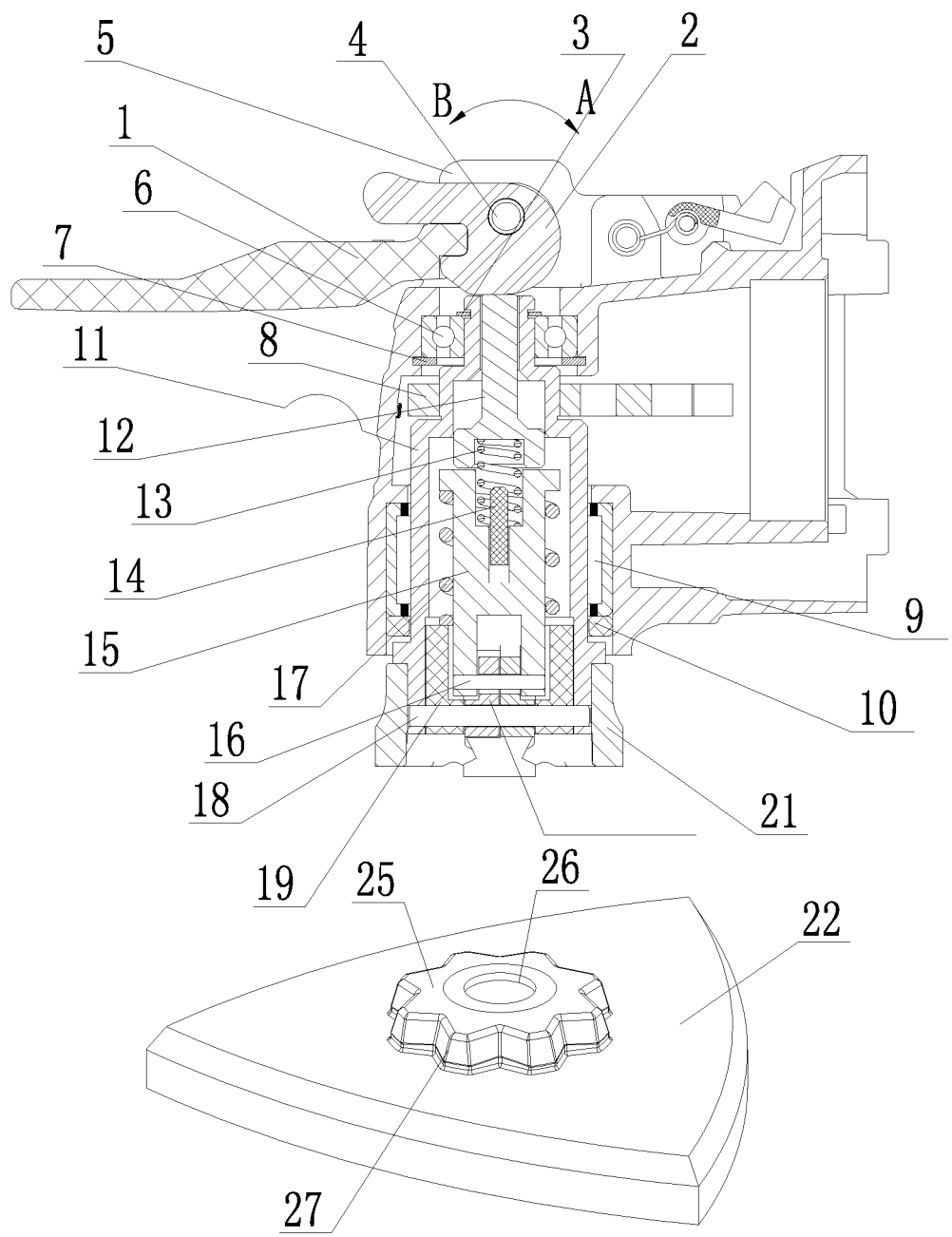
FIG. 2 is a schematic view of a quick change process of the quick change structure for multi-functional saws of the present invention.
Figure 3:
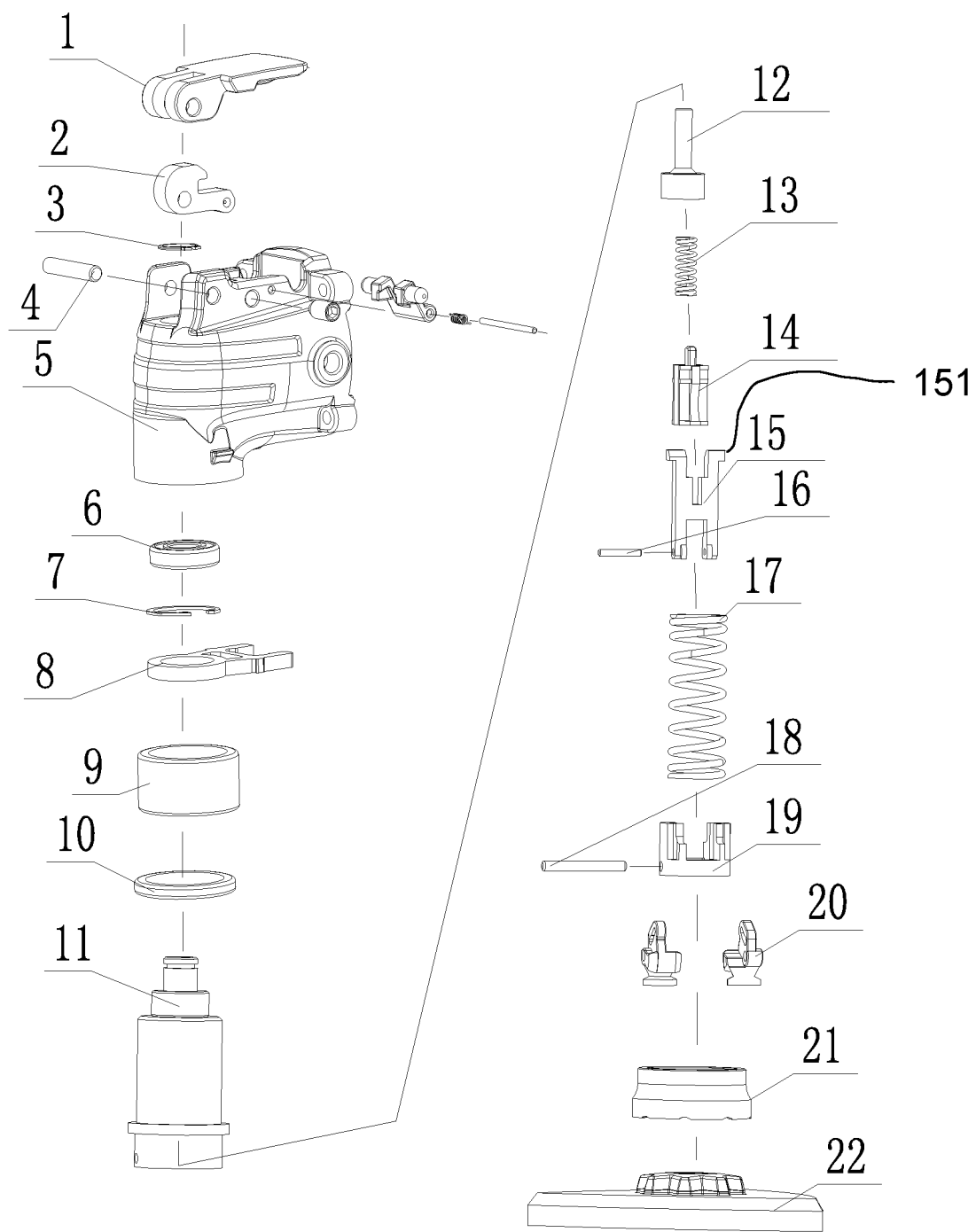
FIG. 3 is an exploded view of the quick change structure for multi-functional saws of the present invention.

As shown in FIG. 1-FIG. 3, the output shaft 11 is a hollow structure; the movable rod 12 is arranged in a hollow position at the upper end of the output shaft 11; the movable rod 12 has a lower expanded end; a compression spring mounting hole is formed at the lower surface of the expanded end; the upper end of the movable bracket 15 is correspondingly provided with a compression spring mounting hole, and a mounting groove is formed in the compression spring mounting hole; the plastic support block 14 is inserted in the mounting groove of the movable bracket 15 to be integrated; the small cylindrical compression spring 13 is mounted between the movable bracket 15 and the movable rod 12, and has two ends respectively inserted into the compression spring mounting holes, thus preventing the small cylindrical compression spring 13 from offsetting. A convex strip 151 is arranged at the outer race of the top of the movable bracket 15; the plastic fixed seat 19 is installed in the inner hole or inner race 111 of the output shaft 11; the plastic fixed seat 19 is externally sleeved on the movable bracket 15; the cylindrical compression spring 17 externally is sleeved on the movable bracket 15; the upper and lower ends of the cylindrical compression spring 17 are respectively supported below the convex strip 151 at the top of the movable bracket 15 and above the plastic fixed seat 19; two cylindrical pin mounting holes are symmetrically arranged on the side wall of the plastic fixed seat 19.

Figure 4:
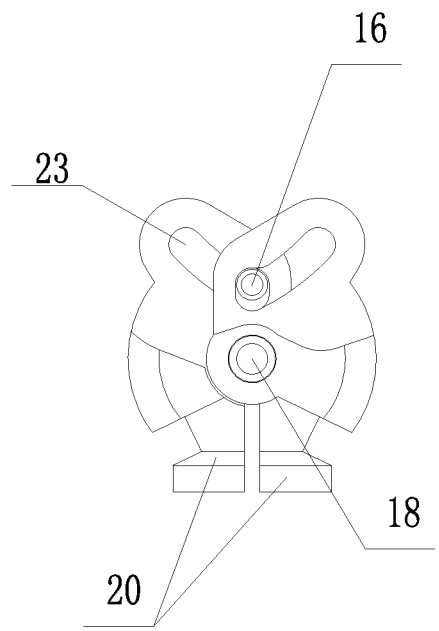
FIG. 4 is a structural view of locking pins of the present invention.

As shown in FIG. 4, the two locking pins 20 are matched with each other; the upper part of each one of the two locking pins 20 is formed with a guide slot 23, while the lower part is formed with a limiting hole; each one of the guide slots has an inward inclination angle from the top down; at the bottom, each one of the guide slots 23 is provided with a bent hook portion 231 as a limiting mechanism of each corresponding one of the locking pins; the movable bracket is provided with a second cylindrical pin 16 at the bottom; the second cylindrical pin 16 passes through the guide slots 23 and can slide along the guide slots 23. The output shaft 11 is provided with a third cylindrical pin 18 at the bottom; the third cylindrical pin 18 passes through the plastic fixed seat 19 and the limiting holes of the two locking pins 20; the aperture of each one of the limiting holes must be greater than the diameter of the third cylindrical pin 18; and the two locking pins 20 can rotate around the third cylindrical pin 18.

Figure 9:
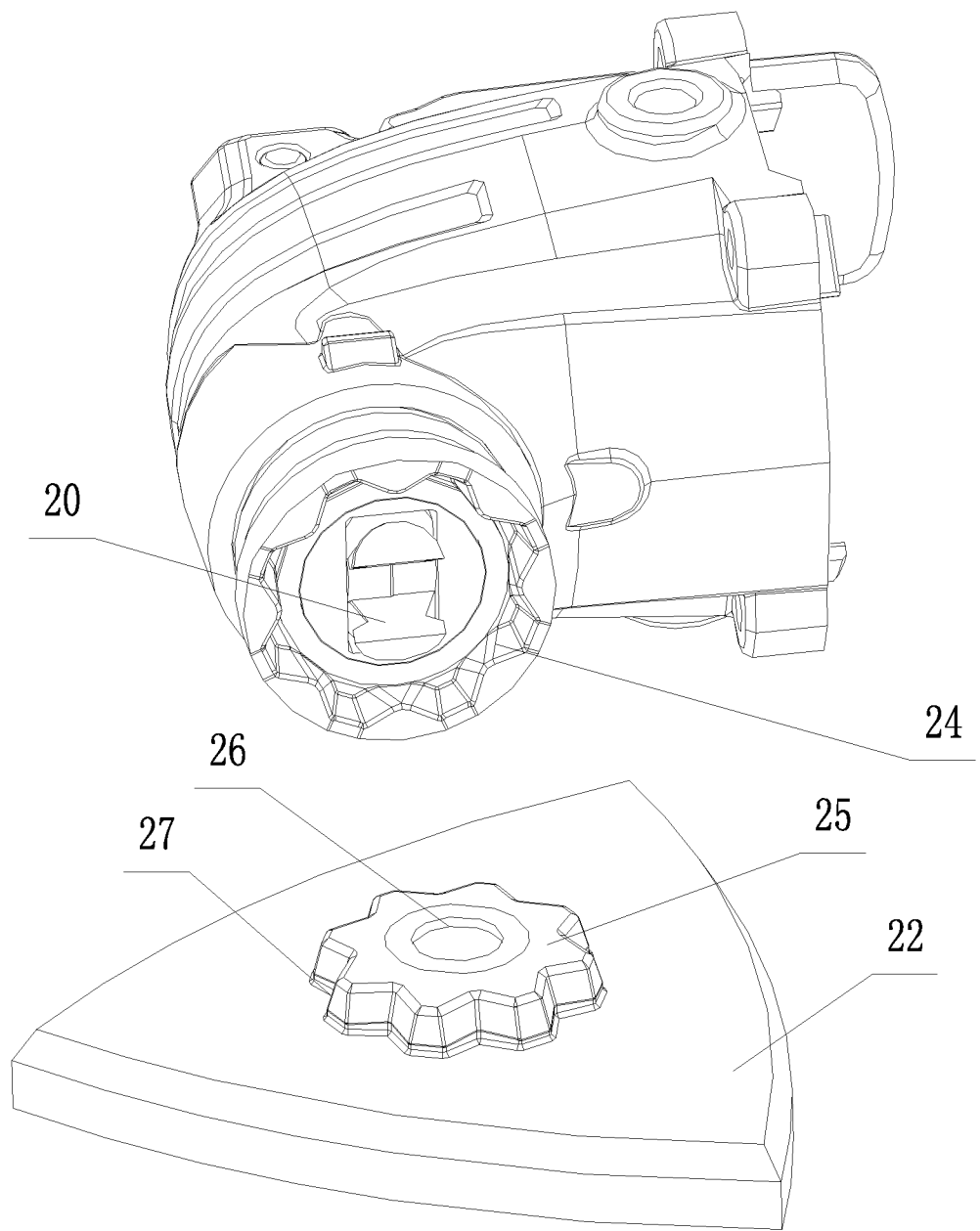
FIG. 9 is a schematic view of the connecting nodes of a positioning ring and the saw blade of the present invention.

As shown in FIG. 9, a positioning ring 21 is sleeved at the outer race of the bottom of the output shaft 11; eight first clamping positions 24 are arranged on the inner wall of the positioning ring 21, and correspondingly, a convex platform 25 is arranged on the upper surface of the saw blade 22; a clamping groove 26 is formed in the center of the convex platform 25; the clamping groove 26 is matched with the locking pins 20; eight second clamping positions 27 are arranged at the outer race of the convex platform 25; each one of the second clamping positions 27 is matched with each corresponding one of the first clamping grooves 24; and when the saw blade 22 is fixed below the output shaft, the locking pins 20 unfold and are clamped in the clamping groove 26, and each one of the first clamping grooves 24 is matched with each corresponding one of the second clamping grooves 27 to prevent the saw blade from falling during use. Upon demand, the number of the first clamping grooves 24 and the number of the second clamping grooves 27 may be set as 6, 10 or 12.

Figure 5:
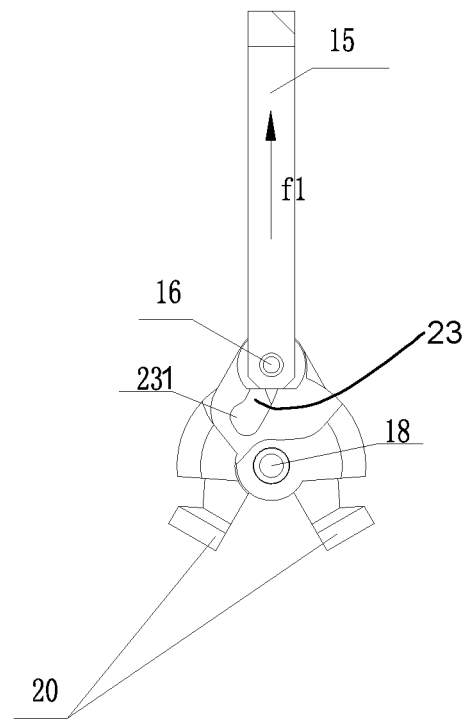
FIG. 5 is a structural view of the locking pins in the unfolded state of the present invention.
Figure 6:
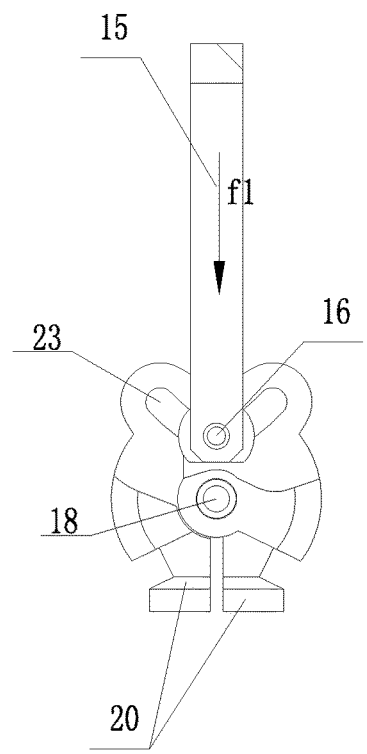
FIG. 6 is a structural view of the locking pins in the folded state of the present invention.
Figure 7:
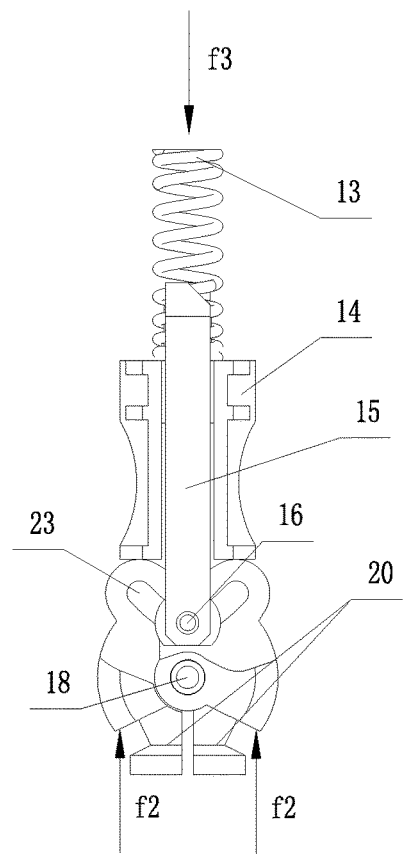
FIG. 7 is a stress analysis diagram of the present invention, where the locking pins recover to the original state after a saw blade is installed.
Figure 8:
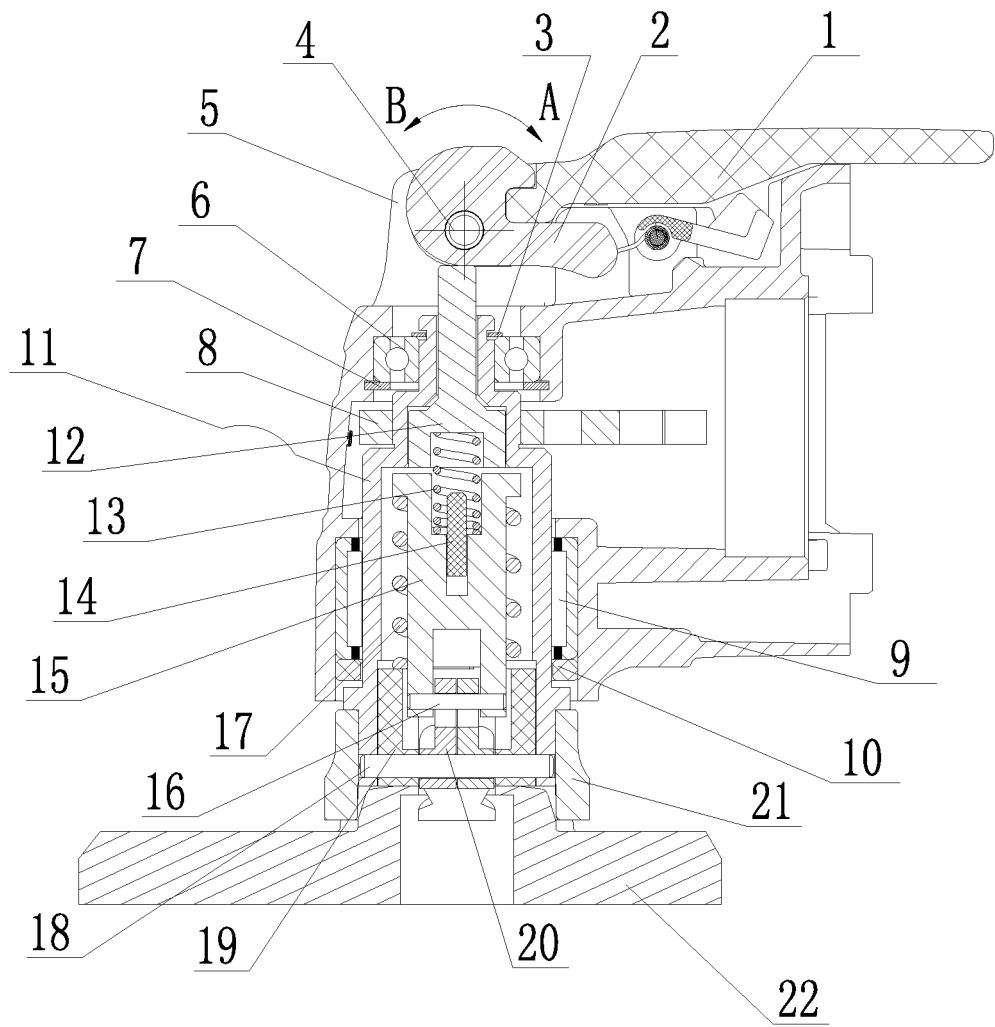
FIG. 8 is a schematic view of a locked saw blade of the quick change multi-functional saw of the present invention.

As shown in FIG. 1 or FIG. 2, the quick change structure for multi-functional saws mainly adopts an eccentric structure. By taking the first cylindrical pin 4 as the rotating center, the quick change handle 1 is pulled to drive the eccentric block 2 to rotate. When the quick change handle 1 rotates from a position A to a position B, the spring forces of the small cylindrical compression spring 13 and the cylindrical compression spring 17 are counteracted due to the existence of an eccentric distance to press the movable rod 11 down and then bring the movable bracket 15 to move up and down. As shown in FIG. 5-FIG. 7, when the movable bracket 15 moves downward, the locking pins 20 are folded through the cylindrical pin 16 and the guide slots 23 on the locking pins 20 after rotating around the cylindrical pin 18. When the quick change handle 1 returns to position A from position B, the movable bracket 15 will not spring back immediately, but continuously remains at the bottoms of each one of the guide slots. Each one of the locking pins 20 is provided with a bent hook at the bottom as the limiting mechanism to prevent the movable bracket 15 from moving upward from the bottom of each one of the guide slots when the quick change handle returns to the position A, so that the locking pins 20 are kept folded in such circumstances. At the same time, the plastic support block 14 is pressed on the locking pins 20 through the small cylindrical compression spring 13, also playing the role of preventing the locking pins 20 from unfolding. To install a saw blade, the saw blade 22 should be placed on a plane first, and then a tool bit of the designed quick change structure is pressed on the saw blade 22 to lock the saw blade. Pressing the tool bit of the quick change structure onto the saw blade 22 is equal to applying an acting force f2 onto the locking pins 20. The acting force f2 drives the locking pins 20 to rotate to counteract the spring force f3 of the small cylindrical compression spring 13 and recover the cylindrical compression spring 17; the movable bracket 15 returns back to the original position; and the locking pins 20 unfold to lock the saw blade 22. The multi-functional saw equipped with the saw blade 22 can be seen in FIG. 8.

In this embodiment, a quick change method for the quick change structure for multi-functional saws includes the following steps:

step 1: as shown in FIG. 1, pulling the quick change handle 1 by taking the first cylindrical pin 4 as the rotating center such that the quick change handle 1 moves from position A to position B, and that the quick change handle 1 drives the eccentric block 2 to rotate;

step 2: counteracting the spring forces of the small cylindrical compression spring 13 and the cylindrical compression spring 17 in virtue of an eccentric distance to press the movable rod 12 down to form a downward acting force f1 and drive the movable bracket 15 to move downward;

step 3: driving the second cylindrical pin 16 at the lower part of the movable bracket to move and reach to the bent hook portions of the guide slots by the movable bracket 15, where each one of the guide slots 23 has an inward inclination angle from the top down, so that the second cylindrical pin applies a transverse acting force onto the locking pins during the downward moving process to drive the locking pins to rotate around the third cylindrical pin 18 and then fold together, and in such circumstances, the locking pins 20 are switched from the state as shown in FIG. 5 into the state as shown in FIG. 6;

step 4: rotating the quick change handle 1 to the initial position, namely from position B to position A, where the bent hook portion of each one of the guide slots plays the limiting role; at the same time, the plastic support block 14 is pressed at the locking pins by the acting force f3 of the small cylindrical compression spring 13, the movable bracket 15 fails to spring back, and the locking pins 20 remain folded continuously, namely the state as shown in FIG. 6;

step 5: as shown in FIG. 7, placing the saw blade 22 below the locking pins 20, and applying an upward acting force f2 to drive the second cylindrical pin 16 to move upward and counteract the spring force f3 of the small cylindrical compression spring 13, driving the movable bracket 15 to move back to the initial position by the effect of the cylindrical compression spring 17, and locking the saw blade 22 by the locking pins.

The present invention and the embodiments are schematically described above. The description does not impose any limit. The attached drawings show some of the embodiments of the present invention, and the actual structure is not limited to the description. With the above enlightenment, those originally skilled in the art may make similar structures and embodiments without creative design on the basis of the principle of the present invention, and those similar structures and embodiments should all fall within the protective scope of the present invention.

What is claimed is:

1. A quick change structure for multi-functional saws, comprising a head housing, an output shaft and a saw blade, wherein the output shaft is a hollow structure; the output shaft is arranged in the head housing, the saw blade is arranged at the bottom of the output shaft and is detachably connected with the output shaft; the quick change structure further comprising a quick change device, wherein the quick change device comprises a quick change handle, an eccentric block, a movable rod, a small cylindrical compression spring, a plastic support block, a movable bracket, a large cylindrical compression spring, a plastic fixed seat, two locking pins and a positioning ring, the quick change handle is matched with the eccentric block and is connected to the top of the head housing through a first cylindrical pin;

wherein the movable rod, the small cylindrical compression spring, the plastic support block, the movable bracket and the large cylindrical compression spring are all arranged in the hollow space of the output shaft, a top of the movable rod contacts the eccentric block, the small cylindrical compression spring is arranged at a bottom of the movable rod, a top of the small cylindrical compression spring contacts the bottom of the movable rod, the plastic support block is inserted into a groove on a top of the movable bracket, a bottom of the small cylindrical compression spring contacts the plastic support block, a convex strip is arranged at an outer race of the top of the movable bracket, the plastic fixed seat is arranged at the outer race of the bottom of the movable bracket, and the plastic fixed seat is fixed with an inner race of a bottom of the output shaft, and the large cylindrical compression spring is externally sleeved on the plastic support block, and has a top end supported at a lower surface of the convex strip at the top of the movable bracket, and a bottom end supported at an upper surface of the plastic fixed seat;

wherein two locking pins are matched with each other; an upper part of each one of the two locking pins is formed with a guide slot, while a lower part of each one of the two locking pins is formed with a limiting hole; each guide slot has an inward inclination angle from the top down, a bent hook portion as a limiting mechanism is arranged at a bottom of each one of the guide slots, a second cylindrical pin is arranged at the bottom of the movable bracket, the second cylindrical pin passes through the guide slot of each one of the two locking pins, a third cylindrical pin is arranged at a bottom of the output shaft, and the third cylindrical pin passes through the plastic fixed seat and the limiting hole of each one of the two locking pins in turn;

wherein a positioning ring is sleeved at a bottom excircle of the output shaft, a plurality of first clamping positions are formed at an inner wall of the positioning ring; a convex platform is formed on an upper surface of the saw blade, a clamping groove is formed in a center of the convex platform, second clamping positions are formed at an external race of the convex platform, the clamping groove is matched with the locking pins, and the second clamping positions and the first clamping positions are consistent in quantity and are matched with each other.

2. The quick change structure for multi-functional saws according to claim 1, wherein a deep groove ball bearing, a shift fork and a needle bearing are arranged between the head housing and the output shaft; the output shaft is divided into three segments, namely an upper segment, a middle segment, and a lower segment, as an outer diameter of the lower segment is larger than an outer diameter of the middle segment, and the outer diameter of the middle segment is larger than an outer diameter of the upper segment; the deep groove ball bearing is arranged on an outer race of the upper segment of the output shaft; the shift fork is arranged on an outer race of the middle segment of the output shaft; and the needle bearing is arranged on an outer race of the lower segment of the output shaft.

3. The quick change structure for multi-functional saws according to claim 1, wherein there are 6, 8, 10 or 12 first clamping positions formed at the inner wall of the positioning ring and, correspondingly, there are 6, 8, 10 or 12 second clamping positions formed at the external race of the convex platform.

4. The quick change structure for multi-functional saws according to claim 1, wherein a compression spring mounting hole is respectively formed at the bottom of the movable rod and at the top of the movable bracket, and upper and lower ends of the small cylindrical compression spring are both inserted into the compression spring mounting holes.

5. The quick change structure for multi-functional saws according to claim 2, wherein a sealing ring is arranged below the needle bearing; an outer race and an inner race of the sealing ring are respectively connected to an outer wall of the output shaft and an inner wall of the head housing.

6. The quick change structure for multi-functional saws according to claim 2, wherein the deep groove ball bearing is fixed through two snap rings; an upper end of the deep groove ball bearing is connected with an exterior of the output shaft through one of the snap rings, and a lower end is connected with an inner wall of the head housing through the other snap ring.

7. The quick change structure for multi-functional saws according to claim 1, wherein the plastic fixed seat is provided with two symmetrical cylindrical pin mounting holes, and two ends of the third cylindrical pin are respectively inserted into the two cylindrical pin mounting holes.

8. A quick change method adopting the quick change structure for multi-functional saws according to claim 1, comprising the following steps:
(1) pulling the quick change handle by taking the first cylindrical pin as a rotating center such that the quick change handle drives the eccentric block to rotate;
(2) counteracting the spring forces of the small cylindrical compression spring and the large cylindrical compression spring in virtue of an eccentric distance to press the movable rod down and then drive the movable bracket to move downward;
(3) driving the second cylindrical pin at the lower part of the movable bracket to move downward and reach the bent hook portion of each one of the guide slots by the movable bracket, wherein each one of the guide slots has an inward inclination angle from the top down, so that the second cylindrical pin applies a transverse acting force onto the locking pins during the downward moving process to drive the locking pins to rotate around the third cylindrical pin and then fold together;
(4) rotating the quick change handle to the initial position, wherein the bent hook portion of each one of the guide slots plays the limiting role; at the same time, the plastic support block is pressed at the locking pins through the small cylindrical compression spring, the movable bracket fails to spring back, and the locking pins keep folded continuously;
(5) placing the saw blade below the locking pins, and applying an upward acting force to drive the second cylindrical pin to move upward and counteract the spring force of the small cylindrical compression spring, driving the movable bracket to move back to the initial position by the effect of the large cylindrical compression spring, and locking the saw blade by the locking pins.

* * * * *